US009708559B2

(12) United States Patent
Gibis et al.

(10) Patent No.: US 9,708,559 B2
(45) Date of Patent: Jul. 18, 2017

(54) METHOD AND DEVICE FOR THE MECHANICAL OR MECHANICAL-BIOLOGICAL TREATMENT OF WASTE

(75) Inventors: Georg Gibis, Ringsheim (DE); Georg Person, Bad Schwalbach (DE)

(73) Assignee: Zweckverband Abfallbehandlung Kahlenberg, Ringsheim (DE)

( * ) Notice: Subject to any disclaimer, the term of this patent is extended or adjusted under 35 U.S.C. 154(b) by 765 days.

(21) Appl. No.: 14/235,214

(22) PCT Filed: Jul. 25, 2012

(86) PCT No.: PCT/EP2012/003161
§ 371 (c)(1),
(2), (4) Date: Mar. 25, 2014

(87) PCT Pub. No.: WO2013/017224
PCT Pub. Date: Feb. 7, 2013

(65) Prior Publication Data
US 2014/0203120 A1    Jul. 24, 2014

(30) Foreign Application Priority Data

Aug. 1, 2011  (EP) ..................................... 11176112
Sep. 29, 2011  (EP) ..................................... 11007924

(51) Int. Cl.
*B02C 23/00*    (2006.01)
*C10L 5/40*    (2006.01)
(Continued)

(52) U.S. Cl.
CPC ............ *C10L 5/40* (2013.01); *B02C 17/1815* (2013.01); *B02C 18/0084* (2013.01);
(Continued)

(58) Field of Classification Search
CPC .. B02C 18/0084; B02C 18/0092; B02C 23/02
(Continued)

(56) References Cited

U.S. PATENT DOCUMENTS 2,938,674 A * 5/1960 Lee ..................... B02C 18/0092
241/152.2
2,954,173 A * 9/1960 Dunwody ............... B02C 13/00
241/138
(Continued)

FOREIGN PATENT DOCUMENTS

CN         101712923 A       5/2010
DE          19602489 A1       7/1997
(Continued)

*Primary Examiner* — Faye Francis
(74) *Attorney, Agent, or Firm* — Kilpatrick Townsend & Stockton LLP (57) ABSTRACT

A method for treating waste in a mechanical or mechanical-biological waste treatment plant is provided. Waste is introduced into the waste treatment plant at at least one input point, the waste is homogenized by way of at least one agitator and the consistency of the waste in the waste treatment plant is determined. Water or waste which has a higher water content than the waste in the waste treatment plant is added in one scenario. Water is removed or waste having a lower water content is added in another scenario. Further, the method involves transporting the introduced waste to at least one output point, and removing the waste. The waste treatment plant is subdivided into at least two zones and in each zone the consistency of the waste is regulated separately by the input of waste and/or addition or removal of water.

21 Claims, 6 Drawing Sheets

(51) Int. Cl.
   *B02C 18/00*   (2006.01)
   *B02C 17/18*   (2006.01)
   *C10L 5/46*   (2006.01)
   *C10L 5/48*   (2006.01)
   *B02C 23/02*   (2006.01)

(52) U.S. Cl.
   CPC .......... *B02C 18/0092* (2013.01); *B02C 23/02* (2013.01); *C10L 5/46* (2013.01); *C10L 5/48* (2013.01); *Y02E 50/10* (2013.01); *Y02E 50/30* (2013.01)

(58) Field of Classification Search
   USPC ............................. 241/41, 78, 277, 299, 21
   See application file for complete search history.

(56) References Cited

U.S. PATENT DOCUMENTS

| | | | | |
|---|---|---|---|---|
| 2,991,947 | A * | 7/1961 | Schuyler | B02C 17/007 241/171 |
| 3,210,018 | A * | 10/1965 | Clark | D21D 5/02 162/236 |
| 3,392,770 | A * | 7/1968 | Whisler | A01D 43/14 241/41 |
| 6,110,727 | A | 8/2000 | Widmer et al. | |
| 8,789,780 | B2 * | 7/2014 | Brosseuk | B03B 5/26 241/20 |
| 2008/0022587 | A1 | 1/2008 | Macchio | |
| 2010/0096336 | A1 | 4/2010 | O'Reilly | |
| 2010/0184176 | A1 | 7/2010 | Ishida et al. | |

FOREIGN PATENT DOCUMENTS

| | | |
|---|---|---|
| DE | 202006000559 U1 | 4/2006 |
| EP | 0937504 B1 | 9/2003 |
| EP | 1916288 A2 | 4/2008 |
| EP | 2200746 B1 | 6/2014 |
| WO | 97/27158 A1 | 7/1997 |
| WO | 2009/043322 A1 | 4/2009 |

\* cited by examiner

METHOD AND DEVICE FOR THE MECHANICAL OR MECHANICAL-BIOLOGICAL TREATMENT OF WASTE

CROSS REFERENCE TO RELATED APPLICATIONS

This is a US national stage application of PCT/EP2012/003161 filed Jul. 25, 2012, which claims priority to EP Application No. 11176112.8, filed Aug. 1, 2011 and EP Application No. 11007924.1, filed Sep. 29, 2011, the entireties of which are hereby incorporated by reference.

The invention relates to a method for the treatment of waste in a mechanical or mechanical-biological waste treatment plant, and to a device for the mechanical or mechanical-biological treatment of waste.

PRIOR ART

Since 2005 in Germany, it has only been possible to deposit waste, in particular municipal waste and domestic waste, at a landfill when it has been pretreated. The assignment criteria with which the pretreated waste has to comply are defined in the German landfill ordinance (Deponieverordnung, DepV). Essentially, the biogenic component and the combustible constituents in the waste in question have to be reduced considerably in order that the assignment values for landfilling can be met. The reduction of these constituents in the waste to be landfilled and also the reduction to a minimum of the waste to be landfilled by recycling and reutilization is increasingly gaining in importance in the EU on account of EU-wide regulations.

If waste is thermally treated in a conventional refuse incineration plant, the incineration residues are able to reliably comply with the assignment criteria of the DepV. Alternatively, waste can be mechanically-biologically treated. Against the background of climate protection and the conservation of finite resources, the recovery of recyclable fractions (metals, plastics material) and conversion to material flows that can be used in some other way (e.g. quality assured substitute fuels) are becoming ever more important with this technique, too. Separate assignment criteria apply in the DepV for the deposition of residues, which can no longer be used, from the mechanical-biological treatment of municipal waste.

In mechanical-biological waste treatment plants, waste, in particular domestic waste having organic components, is treated by separating out coarser constituents and composting or fermenting the remaining fraction that is richer in organic matter. The separated-out coarser constituents are generally reutilized as substitute fuels, the remaining component is in many cases fed to a final rotting process and subsequently landfilled. The biomass to be decomposed is thus not reutilized further and the area and time consumption during the final rotting of such waste is comparatively large.

EP 0 937 504 A2 discloses a method for the reutilization of domestic waste, in which a large part of the organic substances contained therein are used to produce energy. In the method described, a division into coarse and fine materials is carried out in a first step, wherein the coarse materials are divided into impurities and recyclable fractions. In the next step, the fine materials are subjected to a biological treatment. The water squeezed out in the process is used for the production of biogas. After completion of biological drying and the separation out of non-combustible and inert fractions, the solids obtained are reutilized as substitute fuel.

In order to be able to ensure a constant quality of the fuel obtained, it is advantageous to homogenize the biologically treated waste at a defined liquid content before the liquid is squeezed out.

WO 2009/043322 proposes homogenizing waste, after pretreatment in a biological stage, in a mixing container having an agitator. In this case, the consistency of the waste is set such that subsequent squeezing out of the liquid and biological drying of the solid are possible.

WO 97/27158 discloses a method and a device for the biological treatment of organic waste. In the method, the waste is intermixed and intensively watered in order to dissolve organic substances. During the treatment, fresh air is blown in order to support aerobic hydrolysis of the waste.

A disadvantage of this method is a comparatively large water consumption, wherein the water outlets are easily clogged by penetrating waste, this requiring high technical outlay for cleaning and keeping the outlets clear. On account of the high liberation of organic substances, a substitute fuel produced from the waste has a smaller biogenic fuel component. It has also been shown that, as a result of intensive aeration of the waste, aerobic hydrolysis is not substantially promoted and is not essential for the process.

OBJECT OF THE INVENTION

The invention has the object of homogenizing waste, if appropriate after being subjected to a preceding preliminary biological stage, in order to ensure a high and constant quality for the substitute fuels to be produced therefrom. Furthermore, the consistency of the treated waste is intended to be set optimally for the further treatment steps. In this case, the biogenic component of the material obtained from the waste, that is to say the organic component, is intended to be largely preserved and/or used in an ecologically advantageous manner. Furthermore, the plant is intended to be reliable and controllable at any time.

DISCLOSURE OF THE INVENTION

A method is proposed for treating waste in a mechanical or mechanical-biological waste treatment plant, having the following method steps of:
a) introducing waste into the waste treatment plant at at least one input point,
b) homogenizing the waste by way of at least one agitator,
c) determining the consistency of the waste in the waste treatment plant,
d) adding water or waste which has a higher water content than the waste in the waste treatment plant if the water content of the waste in the waste treatment plant is too low, or removal of water or addition of waste having a lower water content if the water content of the waste is too high,
e) transporting the introduced waste to at least one output point,
f) removing the waste,
wherein the waste treatment plant is subdivided into at least two zones and in each zone the consistency of the waste is regulated separately by the input of waste and/or addition or removal of water.

The waste comes from an upstream biological treatment plant or from a waste bunker and is entered from there at an input point of the treatment plant, for example using a conveyor belt, a screw conveyor or a crane. The introduction of the waste can take place continuously or discontinuously, as required. The proposed waste treatment plant is preferably embodied as a multi-zone reactor (MZR). The MZR has a reactor container embodied as an elongate trough, wherein the reactor container is divided into at least two zones and each of these zones may have a separate input point. The MZR comprises, at one end of the trough, an output point at which the treated waste is removed. The waste introduced into the waste treatment plant is transported by means of equalization of the filling level, that is to say the waste flows, without an external drive, from the at least one input point in the direction of the at least one output point. If the waste treatment plant is embodied with a plurality of input points, it is possible to set the treatment duration of the introduced waste by selecting the input point used. Thus, for example, waste which is suitable for further treatment without a substantial residence time in the waste treatment plant, for example homogeneous fibrous materials or sludges, may be added via an input point located close to the output point.

Arranged in the waste treatment plant is an agitator, which homogenizes the introduced waste. At the same time, the consistency of the waste is regulated by setting the water content. The water content is set separately in each zone. For this purpose, water can be added or removed or further waste can be introduced. If, for example, the water content of the waste is too small in one zone, either water or, if available, waste which has a higher water content than the waste already present in the zone in question, for example waste having a high biogenic component (for example kitchen, market or food waste) or sludges, is fed into the zone in question. If the waste has too high a water content in one particular zone, either drier waste, that is to say waste which has a lower water content than the waste already located in the zone, is introduced, or excess water is removed.

The measures taken to regulate the consistency of the waste in a zone, that is to say for example whether water or waste with a higher water content is introduced into the zone, depend on whether corresponding waste is currently available and whether an input point for waste or means for feeding water are arranged in the zone in question. The same goes for the decision as to whether water is intended to be removed or waste having a low water content is intended to be introduced.

As a result of the adjustment of the optimum water content that is carried out in this way, a residence time of the water in the waste treatment plant of controlled duration is achieved. This ensures, together with the agitator, intimate contact of the water with the waste and an optimum mass transfer of water-soluble contents into the liquid. In a subsequent solid/liquid separation, the organic and/or inorganic constituents dissolved and/or suspended in the liquid, and dissolved and/or suspended harmful substances are removed. The control of the fed water quantity ensures a high residual organic component in the solid matter. As a result of these measures, a high biogenic component of the fuels produced from the treated waste is ensured, and this has an effect that is favourable to the climate when these fuels are used to produce energy.

In one embodiment, the waste treatment plant is embodied as a multi-zone reactor and subdivided into three zones. Intensive watering of the introduced waste takes place in the first zone. The object is the production of a very pulpy consistency having a water content of about 70%. Preferably circulation water (waste water from a water treatment, treated process water, service water) is used for watering. As a result, the quantity of waste water is reduced to a minimum, thereby saving resources. However, fresh water may also be used.

In the second zone, the desired water content of about 70% is intended to be maintained throughout the residence time of the waste. For this purpose, the consistency or the water content of the waste is adjusted using the measures already described above.

In the third and final zone, before the waste is output, a defined drier consistency having a water content of approximately 60% is desired. This water content is set by way of the measures already described above and ensures optimal or constant downstream solid/liquid separation and other downstream method stages (e.g. biological drying).

In order to avoid undesired emissions, which may result in an odour nuisance, the MZR is closed in a leaktight manner all around. An explosive atmosphere must not form in the space above the waste filling level during the treatment of the waste. To this end, the air space above the filling level is ventilated by means of air and/or an inert gas and the removed waste air is cleaned. It is not necessary to feed oxygen and/or fresh air into the waste since this method does not provide support for aerobic biological processes.

In a preferred embodiment of the method, large-volume clumps and/or caking of waste in itself and/or on the agitator of the waste treatment plant, which occur in the waste and may occur during the homogenization in accordance with step b), are broken up.

These measures avoid the situation in which cylindrical rolls of material form around the agitator shaft with preferred sliding surfaces on the walls and on the bottom of the waste treatment plant. Introduced water would then flow primarily over the surface and would not mix with the waste.

In a preferred embodiment of the method, the water is fed to the waste to be treated in regions in which the waste has been loosened by the agitator and/or as a result of the breaking up of clumps and/or caking. As a result of the use of the agitator and when the clumps and/or caking are broken up, furrows, through which introduced water can easily penetrate into deeper layers, arise in the waste. The introduction of water into these regions makes it easier to produce a uniform water content in the waste.

During the homogenization of the waste by way of the agitator in accordance with step b), the introduced waste is intermixed.

In another embodiment, the introduced waste is selectively comminuted by the agitator in accordance with step b). The comminuting action of the agitator acts exclusively on softer materials, preferably of biogenic nature, such as biological waste. Hard materials pass through the waste treatment plant without being comminuted.

The waste is transported from the at least one input point to the at least one output point by equalization of the filling level. In this case, the waste flows to the at least one output point on account of locally different filling heights without external action.

In a preferred embodiment of the method, the movement of the agitator supports the transport of the waste. In this case, the direction of flow of the waste is not dependent on the direction of rotation of the agitator. The flowing movement is supported in this case by shaking and/or paddling by the agitator. Since, no advancing elements are arranged on the agitator in order to support the transport, the direction of flow of the waste is not influenced by the direction of rotation of the agitator. Since the direction of rotation of the agitator can be set independently of the waste transport, the directions of movement and possible changes in the direction of rotation are selected such that clumps and caking of waste are largely avoided.

In one embodiment of the method, in order to determine the consistency of the waste in the waste treatment plant, the power requirement of the agitator is determined. At a low water content, the waste has a viscous material consistency and causes high shear forces during mixing and stirring. The power requirement for rotating the agitator shaft is high. By contrast, at a high water content, the waste has a pulpy to liquid consistency and the shear forces that occur are lower. The power requirement for rotating the agitator shaft is lower in this case. The force required to rotate the agitator shaft may be determined for example via the power consumption of the drive of the agitator.

In a further embodiment of the invention, the consistency of the waste is determined optically, in particular via a camera. The camera image may be displayed for example on a monitor in a control room, where it can be examined by operating personnel. Automatic computer-aided image evaluation and/or the use of other sensor types is likewise conceivable.

In a further preferred variant of the method, in order to determine the consistency, a plurality of methods are combined, for example the power consumption of the agitator is monitored and at the same time the consistency of the waste is examined optically.

A further aspect of the invention is the provision of a device for the mechanical or mechanical-biological treatment of waste by the method which has just been presented. The device is preferably embodied as a multi-zone reactor (MZR) and comprises a horizontal reactor container, an output point at one end of the reactor container and a horizontal agitator, wherein the reactor container is subdivided into at least two zones and wherein each zone has means for feeding water, at least one zone is provided with an input point, and means for removing water are arranged in at least one zone.

The reactor container preferably has, at least in the lower reactor container half, a rounded cross section, in particular a cross section in the form of a circular arc. The reactor container is arranged horizontally, wherein even a slight inclination of the reactor container of up to three degrees in the direction of flow is covered by the term horizontally in this description. Such a slight inclination of the cylindrical reactor container can be provided to support the transport of waste. A much greater inclination is not preferred, since otherwise a residence time of defined length of the water and of the introduced waste is no longer ensured.

The reactor container of the MZR is embodied in an airtight manner in order to avoid undesired emissions and odour nuisance. In order that an explosive atmosphere cannot form in the air space above the filling level in the reactor container, the device according to the invention furthermore comprises means for feeding air and/or an inert gas and also means for removing waste air. In a preferred embodiment, the means for feeding the air are arranged at or in the vicinity of the first input point.

In one embodiment of the invention, a closure for closing the input point is arranged at at least one input point. The closure of the input point is embodied preferably as a slide. The closability of the input points makes it easier to embody the reactor container in a gastight manner and helps in this way to avoid undesired emissions.

In further embodiments of the invention, the closure of one or more input points is embodied as a flap. Further closure configurations, for example in the form of a removable cover, are likewise possible, wherein a gastight embodiment of the closure is preferred.

In a preferred embodiment of the invention, at least one of the closures for closing an input point is equipped with means for feeding air. If the closure is embodied as a slide, the air feed rate is controlled via the position of the slide.

In one embodiment of the device, the means for removing water are embodied as shafts in the bottom, wherein slides for closing said shafts are arranged on the shafts.

The shafts are arranged preferably at the lowest point of the cylindrical reactor container and covered with a grating or screen. This avoids the situation in which relatively large pieces of waste can penetrate into the shafts. The slides make it possible to control the removal of water from the interior of the reactor container by opening and closing. In order to remove water, the slides are opened and liquid can penetrate into the shaft through the grating. The individual shafts are connected preferably to a central outflow via a suitable unit, preferably a time-clocked spiral.

In a preferred embodiment, a pressure-resistant slide is arranged at the output point, wherein the pressure resistance is rated such that the slide can retain all of the materials and waste located in the reactor container in each operating state. This slide is an important safety measure, which ensures that no waste and/or liquids can escape in an uncontrolled manner from the MZR. This could occur for example when the water content in the waste is too high. By way of the pressure-resistant slide, the water/waste mixture can be retained until a consistency which is required for controlled removal is re-established by removal of water via the shafts. Thus, the slides which cover the shafts for the removal of water also represent an important safety measure.

The opening in the bottom of the reactor container for the discharge of material is embodied preferably in a rectangular manner and is arranged directly on the rear end wall of the cylinder so that no protrusion remains between the container walls and the opening in the bottom. In embodiments of the reactor container in which the rear end wall is embodied in a curved manner, it is preferred to embody the opening in the bottom in a manner deviating from a strictly rectangular form so that it follows the contour of the rear wall. This supports ordered discharge of material and prevents deposits of material on protrusions of the reactor container. Material is understood to be the waste treated in the waste treatment plant.

In a preferred embodiment of the device, agitator arms and wear-protection elements are arranged on the agitator. The agitator arms support the homogenization, intermixing and selective comminution of the waste. The wear-protection elements reduce material abrasion on the agitator and thus increase the service life. One possible embodiment of the agitator and of the wear-protection elements can be gathered from the utility model DE 20 2006 000 559 U1.

In a further embodiment of the invention, means for breaking up clumps and caking of material are arranged in at least one zone. These means are preferably configured in the form of bars and/or blades and are arranged in the interior in a manner starting from the top and/or from a wall.

In one embodiment of the invention, the means for feeding water are configured as openings in the top of the container. The water passes from said openings onto the surface of the waste and is mixed in and distributed with the aid of the agitator.

In a preferred embodiment of the invention, the means for feeding water are arranged in the region of the agitator arms and/or, if present, in the region of the means for breaking up clumps of material and caking. Since, as already described, water can penetrate deeply into the waste through trenches brought about by the agitator arms, this measure supports uniform watering of the waste.

In one embodiment of the invention, the device furthermore comprises means for optically monitoring the interior. These may be embodied for example as a camera. By way of these means, it is possible to examine the consistency of the waste contained in the MZR optically.

Advantages of the Invention

By way of the method according to the invention, during the intermixing and homogenization, water is only removed from the process when the waste has too high a water content. As a result, a long residence time of the water in the process is achieved and the water throughput overall is lowered. Furthermore, a high organic component remains in the waste, such that the substitute fuel subsequently produced therefrom has a high biogenic component. If waste having a lower water content than the waste currently located in the container is also available, the water content can also be lowered overall by the introduction of this drier waste. Since only little water is removed from the process, only a small amount of water has to be reprocessed, too. Appropriate downstream units are required only little and can be given smaller dimensions.

As a result of the provision of a plurality of input points in the various zones of the waste treatment plant embodied preferably as a multi-zone reactor, it is furthermore possible to regulate the treatment time of the waste. Thus, for example homogeneous fibrous or sludge-like waste, which requires only a short residence time in the waste treatment plant, can be introduced into the waste treatment plant at an input point located close to an output point. As a result, the effective processing capacity of the waste treatment plant can be optimized.

Furthermore, in the method according to the invention, no or only a little biological activity in the waste is desired. This avoids the situation in which, in order to maintain aerobic processes, large quantities of oxygen-rich air have to be introduced into the waste. In the method according to the invention, only air or inert gas is fed in order to prevent the formation of explosive atmospheres. A further effect of this is that a smaller quantity of waste air has to be processed in order to avoid undesired emissions and odour nuisance in the environment of the waste treatment plant.

The provided breaking up of clumps and/or caking prevents roll-shaped material accumulations that otherwise occur and would rotate together with the agitator arms. The breaking up of these material accumulations at an early stage ensures improved homogenization of the waste and guarantees a constant quality of the substitute fuel obtained.

The preferred introduction of water into the regions which have been loosened by the agitator arms or by the breaking up of clumps ensures that the water can penetrate easily and fully into the material. The contact between waste and water is considerably improved and the removal of harmful substances from the waste is made easier.

As a result of the selective comminution of the biomass contained in the waste by the agitator, the organic constituents can be distributed uniformly throughout the material during homogenization. At the same time, the coarse structures of the material are retained. The coarse material structures ensure that the material can be aerated well during downstream biological drying. As a result, a uniform drying result and constant quality of the substitute fuel obtained from the material is ensured.

On account of the introduced waste being transported by means of equalization of the filling level, additional advancing elements, for example on the agitator, are superfluous. As a result, not only can the agitator be optimized fully for its homogenization and comminution function, but also the transport of the waste becomes independent of the direction of rotation of the agitator. This makes it possible to reverse the direction of rotation of the agitator multiple times during the intermixing of the material. In this way, wear on one side is prevented and wrapping with elongate waste parts such as strings, cables, sheets and the like is minimized.

As a result of the provided optical examination of the interior of the reactor container, it is not only easy to draw conclusions about the material consistency, but also possible critical system states can be easily detected and remedied.

Since, in the method according to the invention, aerobic decomposition and/or aerobic hydrolysis do not have to be actively supported, it is not necessary to introduce oxygen-rich air into the waste. It is therefore possible to dispense with the arrangement of corresponding systems, for example air lances. Similarly, the much lower removal of water from the process has an advantageous effect on the means for removing water. These can now generally be covered with a slide so that no material can penetrate into them. Clogging of the means for removal of water is therefore unlikely and the arrangement of corresponding means for scraping free or flushing the means for removal of water is superfluous.

The provision of a pressure-resistant slide at the at least one output point guarantees reliable operation of the plant even in the case of operating errors or of critical operating states brought about by the input of particularly water-rich waste. Waste or free water located in the waste treatment plant can be retained reliably until the material consistency has been set back to a value which ensures reliable and controlled removal,

BRIEF DESCRIPTION OF THE DRAWINGS

The invention is described in more detail in the following text with reference to the drawings, in which.

VARIANT EMBODIMENTS

Figure 1:
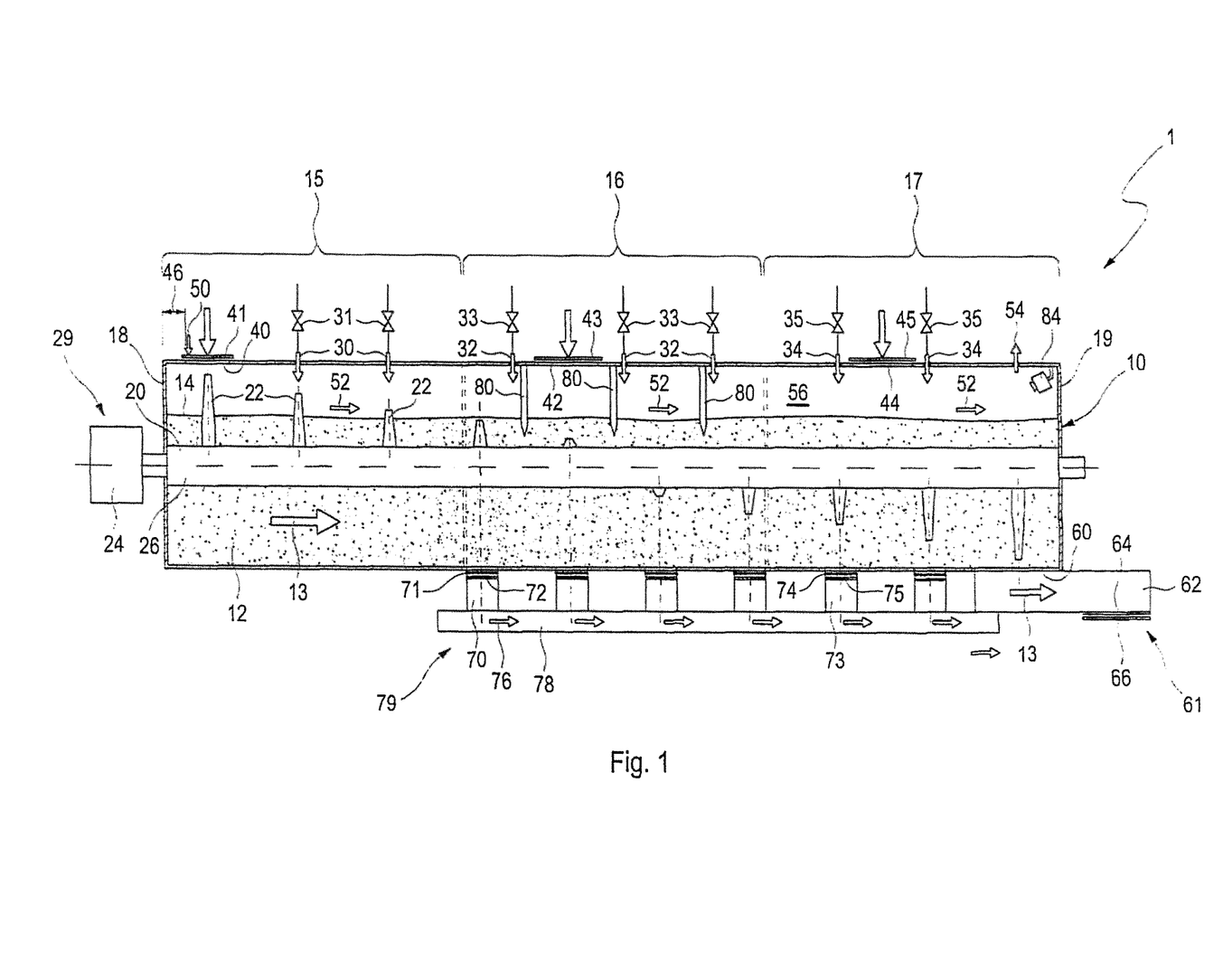
FIG. 1 shows a variant embodiment of the waste treatment plant according to the invention, having three zones, in a view from the side.

FIG. 1 shows a schematic illustration of the waste treatment plant according to the invention in an illustration from the side.

FIG. 1 shows a reactor container 10, which is embodied as a horizontal container. The length of the reactor container 10 is typically in the range from 20 m to 30 m. In the lower region, the cross section of the reactor container is preferably round, in particular embodied as a circular area. The diameter of the container 10 is between 3 m and 6 m. In the upper region, in addition to rounded geometries, angular, for example rectangular geometries, are also possible. Examples are given in the subsequent views from the front. The reactor container 10 accommodates an agitator shaft 20 which passes through the reactor container 10 along the entire length from the front end wall 18 to the rear wall 19. In the embodiment illustrated in FIG. 1, the agitator shaft 20 breaches the end wall 18 and the rear wall 19. On the side of the end wall 18, an agitator drive 24 is arranged on the agitator shaft 20. By way of said agitator drive 24, the agitator 29 can be rotated in both directions of rotation. In other embodiments of the invention, the agitator drive 24 may also be arranged in the region of the rear wall 19. Embodiments in which an agitator drive is arranged on both sides of the reactor container 10 are likewise conceivable.

In the interior of the reactor container 10, the agitator shaft 20 is coated with a wear-protection means 26. Depending on the configuration of the wear-protection means 26, the agitator 29 is not only protected against wear by a type of shielding of the agitator arms 22, but controlled deposition of waste is created by metal ribs axially attached to the agitator shaft 20. As a result of this deposition of waste, material abrasion and corrosion on the agitator shaft 20 itself are avoided. A plurality of agitator arms 22 are arranged on the agitator shaft 20 in a manner distributed along the entire length of the reactor container 10. In the embodiment illustrated in FIG. 1, the agitator arms 22 are arranged equidistantly from one another. By way of the agitator arms 22, waste 12 located in the reactor container 10 is intermixed. In order to transmit the forces that occur during the intermixing of the waste 12 uniformly to the agitator shaft 20, the agitator arms 22 are arranged in different directions on the agitator shaft 20. In the embodiment illustrated in FIG. 1, two adjacent agitator arms 22 enclose a constant angle and the direction in which the agitator arms 22 point rotates from 0° at the end side 18 of the reactor container to 180° at the rear side 19 of the reactor container 10. In further embodiments of the invention, other orientations are also possible. For example, the rotation of the orientation of the agitator arms 22 may be a multiple of 180°. Similarly possible is a pseudo-random distribution of the orientations of the agitator arms 22, in the case of which the forces on the agitator shaft are balanced.

In the embodiment shown in FIG. 1, the waste treatment plant 1 is embodied as a multi-zone reactor (MZR) and is divided into three zones 15, 16, 17. In each zone, an opening 40, 42, 44 for the input of waste is arranged in the top. The opening 40 provided for the input of waste in the first zone 15 is in this case arranged at a distance 46 from the end wall 18. As a result, not only can introduced material be distributed more quickly in the interior of the reactor container, but premature wear on the end side 18 by material abrasion is prevented. In order to close the input openings 40, 42, 44, a slide 41, 43, 45 is provided for each opening. In this case, the slide 41 for the input opening 40 in the first zone has an additional opening 50, through which air can be introduced into an air space 56 above the filling level 14 of the waste 12 even when the slide 41 is closed. Waste air is removed from the reactor container 10 via an air extractor 54 which is arranged in the vicinity of the rear wall 19 of the reactor container 10. As a result, an air flow in the direction provided with reference sign 52 is generated. On account of the continuous air flow, combustible gases are removed from the air space 56 and so it is not possible for an explosive atmosphere to form. Likewise arranged in the top are openings for water input 30, 32, 34. These openings are arranged in a manner distributed along the entire length of the reactor container 10 and across all the zones 15, 16, 17. Above the openings for water input 30, 32, 34 there are water valves 31, 33, 35, via which the quantity of the water input can be controlled.

The openings for water input 30, 32, 34 are arranged flush with the top of the reactor container 10 in the embodiment illustrated in FIG. 1. In a further embodiment of the invention, the openings for water input 30, 32, 34 are configured in the form of pipes which project partially into the interior of the reactor container 10.

In the second zone 16 and in the third zone 17, means for the removal of excess water 79 are arranged on the underside of the reactor container 10. These means 79 comprise shafts 70, 73 which are covered by a screen 71, 74 in order to prevent the penetration of waste into the shafts 70, 73. In order to control the water output, slides 72, 75 are fitted on the shafts 70, 73, it being possible to close the shafts 70, 73 in a sealed manner by way of said slides 72, 75. Water removed from the reactor container 10 is collected via the shafts 70, 73 in a central water outflow which, in the embodiment shown in FIG. 1, is embodied as a spiral 78. By way of the spiral 78, in contrast to a conventional pipe, water having a large content of floating and settling matter and other suspended substances can also be reliably discharged. The direction of flow of the water is indicated by the arrows 76.

In the third zone 17, an opening 60 in the bottom is arranged on the underside of the container 10 in the region of the rear wall 19. In order to avoid deposition of material in the region of the rear wall 19, the opening 60 in the bottom preferably immediately adjoins the rear wall 19 and is provided preferably with a rectangular cross section. An output unit 61 follows beneath the opening 60 in the bottom. In the embodiment shown, the output unit is configured as a double screw conveyor 62. Further possible embodiments for the output unit 61 comprise double spirals, single screw conveyors or single spirals. At the rear end of the double screw conveyor 62, an output opening 64 is located in the bottom. In order to close the output opening 64, a pressure-resistant slide 66 is furthermore attached to the output unit 61. The pressure resistance of the slide 66 is selected such that it is capable of retaining the waste 12 in each operating state of the waste treatment plant 1 according to the invention.

In order to allow better monitoring of the interior of the reactor container, a camera 84 is installed in the reactor container 10. In the embodiment illustrated in FIG. 1, the camera 84 is fitted on the top of the reactor container 10, in the region of the rear wall 19. In other embodiments, it is also possible to arrange the camera in other regions of the reactor container 10. In addition to the top of the reactor container 10, the upper regions of the walls are also suitable for receiving the camera 84. An embodiment of the waste treatment plant 1 in which a plurality of cameras are installed in the interior of the reactor container 10 is also conceivable.

In order to prevent the formation of material rolls by caking of the waste 12 in itself and/or on the agitator shaft 20 or the agitator arms 22, a plurality of means, in the form of cylinder cutters 80, for breaking up clumps and/or caking are arranged in the second zone 16, starting from the top. The cylinder cutters 80 are preferably embodied in the form of bars, wedges or blades and are preferably fixed to the top.

The waste treatment plant 1 illustrated in FIG. 1 is embodied as an MZR and has three different zones 15, 16, 17 having different tasks or treatment steps and treatment options for introduced waste 12.

In the first zone 15 of the MZR, intensive watering of the introduced waste 12 takes place. The water is applied to the introduced waste 12 via the valves 31 and the openings in the top 30. By rotation of the agitator shaft 20, the agitator arms 22 begin to homogenize and selectively comminute the waste 12. In the embodiment illustrated in FIG. 1, the openings 30 for the input of water are located directly above the agitator arms 22 in the first zone 15. The water flows directly through the trenches created in the waste 12 by the agitator arms 22 and can in this way penetrate deeply into the waste 12. What is desired is a very pulpy consistency of the waste 12 with a water content of about 70%. The power requirement of the agitator drive 24 provides an indication of the consistency of the waste 12. If the consistency is too firm, that is to say the water content is too low, an increased power requirement for rotating the agitator 29 is established at the agitator drive 24. If the water content is too high, correspondingly lower forces occur or a lower power requirement than in normal operation is measured. By equalization of the filling level, the introduced material 12 flows on into the second zone 16 in the direction indicated by the reference sign 13. The introduced waste 12 requires up to one day to flow from the first zone 15 into the second zone 16.

In order to set the desired water content, circulation water (process water or service water) is preferably used. It is possible to feed fresh water, but this is not preferred, since externally fed fresh water increases the quantity of waste water to be processed.

In the second zone 16 of the MZR, the desired consistency with a water content of about 70% is intended to be set or maintained during the residence time of the waste 12, which likewise takes up to about one day. An indication of the consistency or the water content of the waste 12 is obtained again via the power requirement of the agitator drive 24. If the water content of the waste 12 is too high, the slides 72 can be opened in order to remove a part of the water. Since the water has a high content of organic substances, it can be fed for example to a biogas plant for aftertreatment.

A further possibility for reducing the water content of the waste 12 is the addition of waste which has a lower water content than the waste 12 located in the reactor container 10. This drier waste can be introduced directly into the second zone 16 via the opening 42.

If, by contrast, the water content of the waste 12 is too low, water can be introduced via the openings for water input 32 in the top by opening the valves 33. Since, in the embodiment shown, cylinder cutters 80 are installed in the second zone 16, it is preferred to arrange the openings for water input 32 in the region of the cylinder cutters 80. The cylinder cutters 80 loosen the waste 12 and thus make water input easier. Alternatively, waste which has a greater water content than the waste 12 in the interior of the reactor container 10 can in turn be introduced via the input opening 42. Examples of this waste are waste having high biogenic components (e.g. kitchen, market or food waste) or sludges. The waste 12 flows on from the second zone 16 into the third zone 17, on account of the equalization of the filling level.

The third zone 17 of the MZR represents a pre-dewatering or dripping zone upstream of the downstream output. The very pulpy consistency of the waste 12 having a water content of about 70% is reduced to a defined drier consistency having a water content of about 60%. The reduced water content ensures optimum or constant downstream solid/liquid separation. Since a drier consistency of the waste 12 exerts greater forces on the agitator 29, it is preferred to also provide openings for water input 34 in the third zone 17, in order if appropriate to reduce the forces that occur by water input. Excess water is discharged again via shafts 73 in the bottom.

Operation of the waste treatment plant 1 at a reduced water content results in higher internal frictional forces in the waste 12. This makes the final homogenization of the waste 12 easier and requires the further comminution of piece-form waste constituents.

Via the opening 60 in the bottom, the waste 12 finally passes into the output unit 61, from where it is conveyed to the output opening 64 via the double screw conveyor 62. Following the waste treatment plant 1 according to the invention, the treated waste can be fed to a device for drying the waste, wherein it is processed to form a substitute fuel for example by squeezing and subsequent biological drying. On account of the configuration of the waste treatment plant 1 as an MZR with subdivision into three zones 15, 16, 17 and with the openings, arranged in the respective zones, for waste input 40, 42, 44, different waste can be introduced at different points in the waste treatment plant 1 in order to optimize the treatment time thereof. Thus, the feeding of conventional domestic waste preferably takes place for example in the first zone 15. In the second zone 16, it is possible to feed for example waste which requires no further shear forces for homogenization and is easily homogenizable, for example liquid or pulpy waste. Preferably waste which is already largely homogeneous and in small pieces and is suitable for further treatment without a substantial residence time in the waste treatment plant 1, for example fibrous materials or rejects, is introduced in the third zone 17.

Besides the monitoring of the material consistency via the power consumption of the agitator drive 24, the consistency of the waste 12 in the interior of the reactor container 10 can also be examined via the camera 84. This makes it possible to take regulating measures, such as re-watering or the discharging of excess water, at any time from the control room, regardless of the respectively prevailing power consumption. This is also advantageous because a defined power consumption does not necessarily have to correlate with a specific water content in the waste 12 but may also be influenced by other factors (for example a specific waste composition on account of seasonal fluctuations or the origin of the waste).

Figure 2:
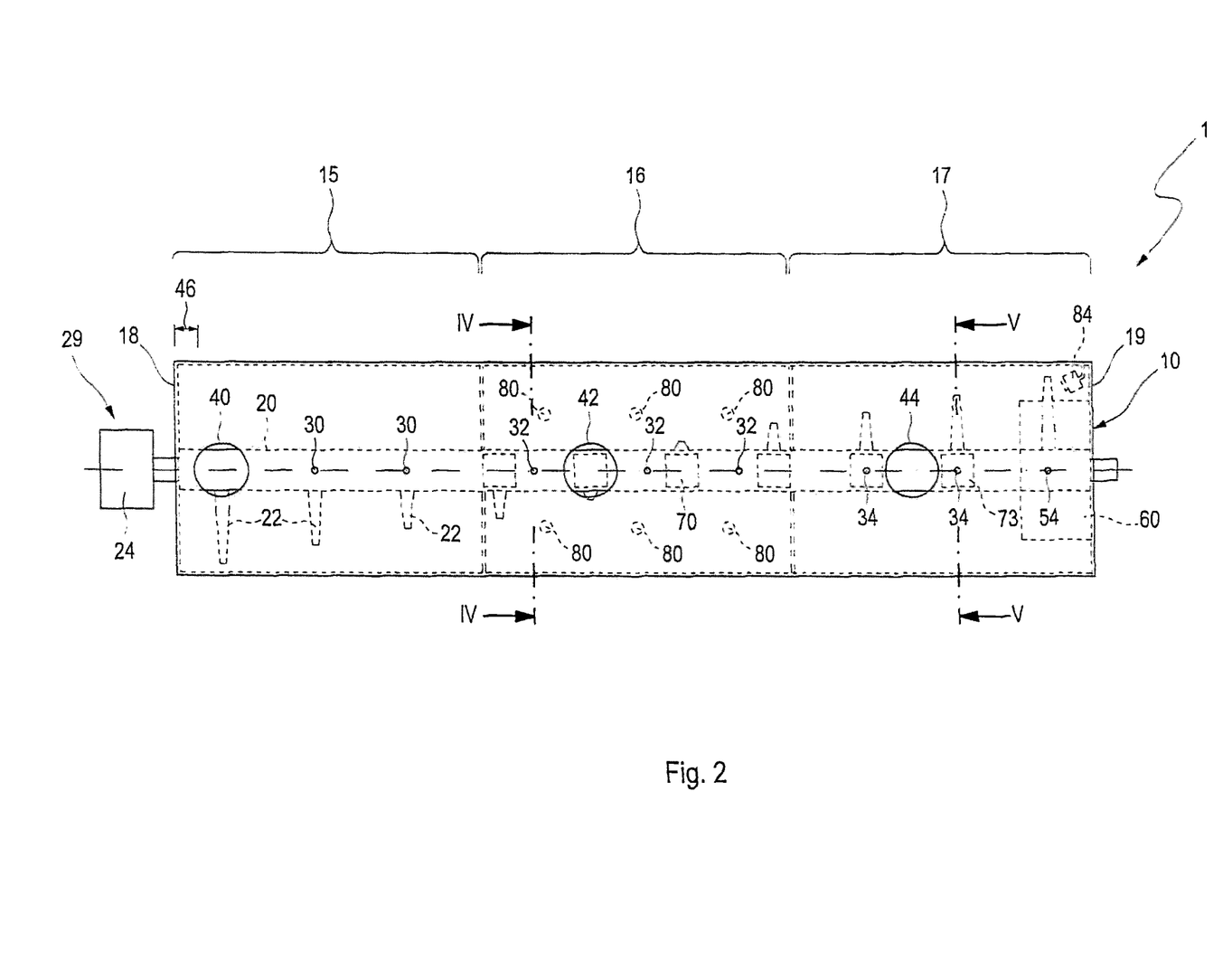
FIG. 2 shows a schematic view of one embodiment of the waste treatment plant according to the invention in a view from above.

FIG. 2 illustrates a schematic illustration of the waste treatment plant according to the invention in a view from above.

The cylindrical container 10 of the waste treatment plant 1 is illustrated from above in FIG. 2. The agitator 29 passes with its agitator shaft 20 through the entire length of the reactor container 10 from the end wall 18 to the rear wall 19. The agitator drive 24 is arranged outside the reactor container 10 in the region of the end wall 18. The wear-protection means 26 and the agitator arms 22 are arranged on the agitator shaft 20 in the interior of the container 10. The agitator arms 22 are distributed equidistantly along the entire length of the reactor container 10. The direction in which the agitator arms 22 point is in this case again selected to be different in each case.

The waste treatment plant 1 illustrated in FIG. 2 is again embodied as an MZR and the reactor container 10 thereof is subdivided into three zones 15, 16, 17. Openings for waste input 40, 42, 44, and also openings for water input 30, 32, 34, are provided in each of the three zones. The opening for waste input 40 in the first zone 15 is arranged at a distance 46 from the end wall 18, in order to prevent premature wear of the end wall 18. As can be gathered from the illustration in FIG. 2, one of the agitator arms 22 is arranged in each case directly beneath one of the openings for waste input 40, 42, 44. In the first zone 15 and in the third zone 17, the openings for water input 30 and 34, respectively, are likewise located above in each case one agitator arm 22. Cylinder cutters 80 are arranged in the second zone 16 and the openings for water input 32 are fitted in the vicinity of the cylinder cutters 80 in the second zone 16 in contrast to the other zones. The opening 60 in the bottom, said opening 60 having a rectangular cross section, is located directly on the rear wall 19 at the end of the reactor container 10. Shafts 70, 73 are again arranged in the bottom of the reactor container 10 in order to be able to discharge excess water. In the embodiment illustrated in FIG. 2, all of the openings in the top of the reactor container 10 are arranged in the middle directly above the agitator 29.

Figure 3:
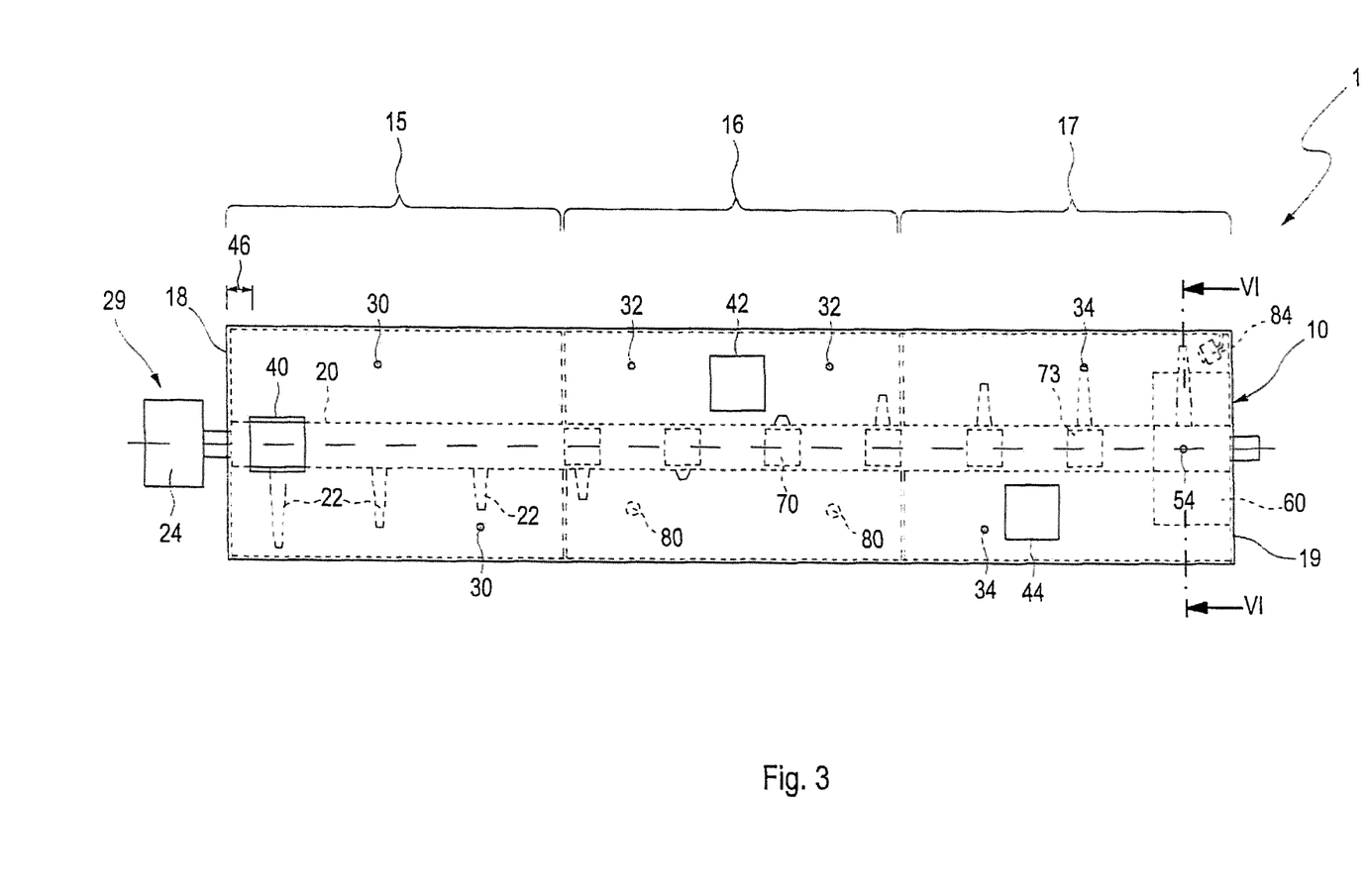
FIG. 3 shows a schematic view of a further embodiment of the waste treatment plant according to the invention, having three zones, in a view from above.

FIG. 3 shows a further embodiment of the waste treatment plant according to the invention in a view from above.

The reactor container 10 of the waste treatment plant 1 is illustrated in FIG. 3. The agitator 29 extends along the entire length of the cylindrical reactor container 10 from the end side 18 as far as the rear wall 19. As in the preceding embodiments, the agitator again has an agitator drive 25, a wear-protection means 26 and a multiplicity of agitator arms 22. On account of its configuration as an MZR, the reactor container 10 is again subdivided into three zones 15, 16, 17 and has various openings in the top. In the first zone 15, an opening for waste input 40 is arranged in the top of the reactor container 10, centrally above the agitator 29 at a distance 46 from the end wall 18. Although the openings for water input 30 in the first zone 15 are still arranged at the height of one of the agitator arms 22 in the embodiment illustrated in FIG. 3, they are offset from the middle of the reactor container 10. Cylinder cutters 18 are again arranged, starting from the top, on one side of the agitator 29 in the region of the second zone 16. The openings for water input 32 in the second zone 16 are in turn fitted at the height of the cylinder cutters 80, but likewise offset from the middle of the reactor container 10. The same applies for the opening for waste input 42 in the second zone 16, which is likewise fitted in a manner offset from the agitator 29 but at the height of one of the agitator arms 22. In the third zone 17, the openings for water input 34 are likewise not fitted directly above the agitator 29 but in each case in the region of one of the agitator arms 22. The opening for waste input 44 in the third zone 17 is also fitted in a manner offset from the agitator 29 in the embodiment illustrated in FIG. 3. The opening 60 in the bottom, said opening 60 directly adjoining the rear wall 19, is located in the bottom of the reactor container 10 in the region of the rear wall 19. As in the preceding embodiments, the opening 60 in the bottom has a rectangular cross section.

Figure 4:
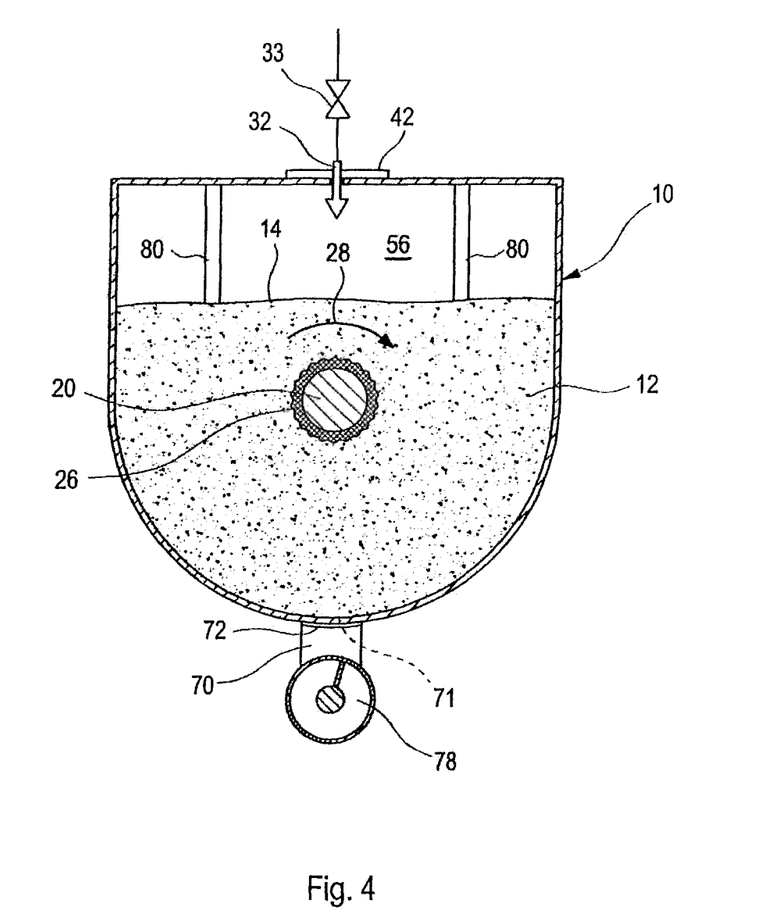
FIG. 4 shows a section through the waste treatment plant according to the invention at the level of the roll breakers in a view from the front.

FIG. 4 shows a sectional illustration of the waste treatment plant according to the invention according to FIG. 2 along the line indicated IV in an illustration from the front.

FIG. 4 shows a section through the waste treatment plant 1 according to the invention at the height of the cylinder cutters 80 in the second zone 16. The cross-sectional area of the reactor container 10 can be seen, said cross-sectional area being rounded in the lower region and being configured in a virtually circular manner. Towards the upper side of the reactor container 10, the shape transitions into a rectangle. Located in the bottom of the reactor container 10 is the shaft 70 for water removal. The shaft 70 is covered with a grating 71 and can be closed in a sealed manner by way of a slide 72. In the embodiment illustrated in FIG. 4, the grating 71 and the slide 72 are configured in a curved manner and follow the curvature of the reactor container 10. Arranged beneath the shaft 70 is a spiral 78 which transports the water away, together with the substances dissolved therein and floating substances suspended therein. Visible in the middle of the container 10 is the agitator shaft 20, on which the wear-protection means 26 is fitted. The direction of rotation of the agitator 29 is indicated by the arrow having the reference sign 28. While the waste 12 is processed in the interior of the reactor container 10, the direction of rotation of the agitator shaft 20 is changed multiple times. This avoids the situation in which long fibres, sheets and the like are able to wind around the agitator shaft 20. The cylinder cutters 80 are arranged in a manner starting from the top of the reactor container 10. The roll cutters 80 prevent all of the material 12 from rotating as a single cylindrical roll together with the agitator shaft 20. One of the openings for water input 32 in the second zone 16 can be seen in the top of the reactor container 10.

Figure 5:
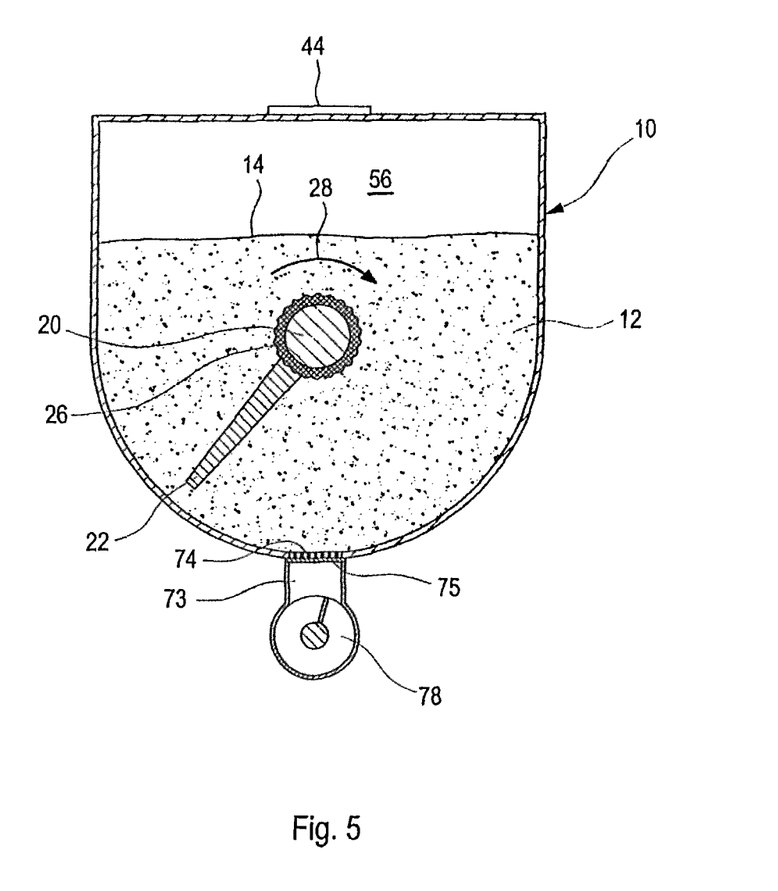
FIG. 5 shows a section through the waste treatment plant according to the invention at the level of an input point in a view from the front.

FIG. 5 illustrates a section at the point indicated V through the waste treatment plant illustrated in FIG. 2.

The cross section of the reactor container 10 can be seen in FIG. 5. In the lower region, the cross section of the reactor container 10 is round, in particular, as shown here, configured virtually in the form of a circular arc. In the upper region, the cross section transitions into a rectangular shape. In the middle of the reactor container 10, the agitator shaft 20 having the wear-protection means 26 can be seen. In the section illustrated in FIG. 5, one of the agitator arms 22 can furthermore be seen. Exactly as in the preceding section, one of the shafts 73 for removing excess water can be seen in the bottom of the reactor container 10. The shaft 73 is in turn covered with a grating 74 and can be closed in a sealed manner by a slide 75. In the embodiment illustrated in FIG. 5, the grating 74 and the slide 75 are embodied in a planar manner and do not follow the curvature of the reactor container 10. The removed water is discharged by the spiral 78. One of the openings for waste input 44 can be seen in the top of the reactor container 10.

Figure 6:
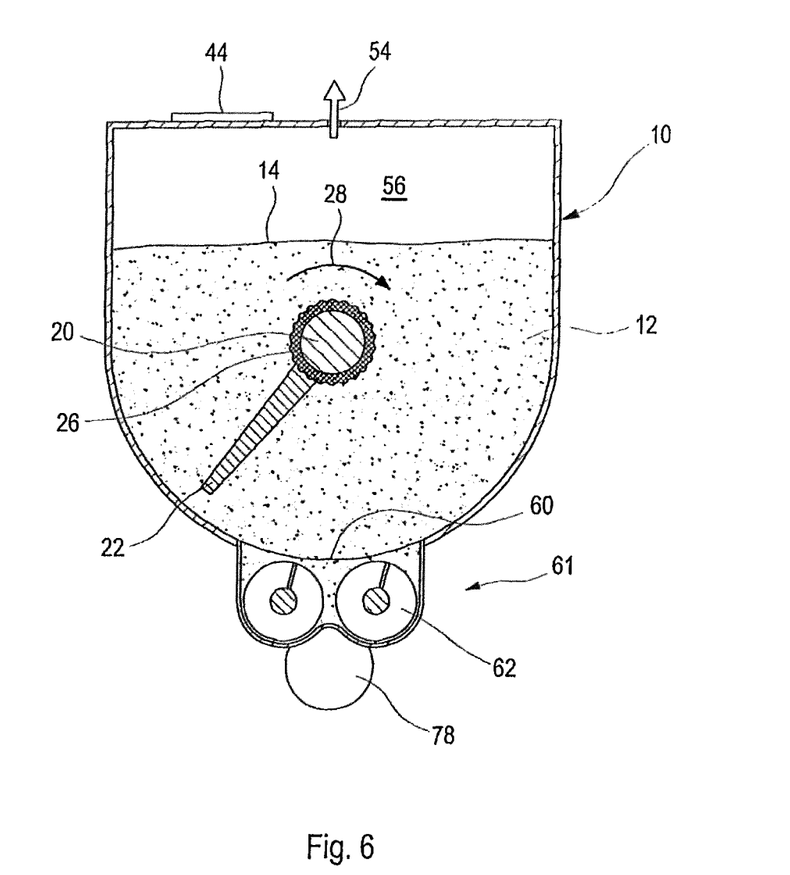
FIG. 6 shows a section through a further embodiment of the waste treatment plant according to the invention at the level of an output point in a view from the front.

A section along the line indicated VI in the illustration of the waste treatment plant according to FIG. 3 can be seen in FIG. 6.

In the embodiment illustrated in FIG. 6 of the waste treatment plant 1, the reactor container 10 has a substantially circular cross section. In the middle of the reactor container 10, the agitator shaft 20 having the wear-protection means 26 and one of the agitator arms 22 can be seen. Located in the lower region of the reactor container 10 is the opening 60 in the bottom, through which the waste 12 can pass into the output unit 61. From there, the waste 12 is transported via the output unit 61, preferably embodied as a double screw conveyor 62, to the output opening 64. The agitator arm 22 arranged directly above the opening 60 in the bottom supports the flow of waste 12 in the direction of the output unit 61.

LIST OF REFERENCE SIGNS

1 Waste treatment plant
10 Reactor/trough-shaped container
12 Waste or material in the reactor
13 Direction of flow of the waste or material
14 Filling level
15 First zone 16 Second zone
17 Third zone
18 Front end wall
19 Rear end wall
20 Agitator shaft
22 Agitator arms
24 Agitator drive
26 Wear-protection means
28 Direction of rotation
29 Agitator
30 Opening for water input into the first zone
31 Valve for water input into the first zone
32 Opening for water input into the second zone
33 Valve for water input into the second zone
34 Opening for water input into the third zone
35 Valve for water input into the third zone
40 Opening for waste input into the first zone
41 Slide with air feed in the first zone
42 Opening for waste input into the second zone
43 Slide at the waste input in the second zone
44 Opening for waste input into the third zone
45 Slide at the waste input in the third zone
46 Distance from the end wall
50 Air input
52 Air flow
54 Air extractor
56 Air space
60 Opening in the bottom
61 Output unit
62 Double screw conveyor
64 Output opening
66 Pressure-resistant slide
70 Shaft for water removal in the second zone
71 Grating/screen for water removal in the second zone
72 Slide for water removal in the second zone
73 Shaft for water removal in the third zone
74 Grating for water removal in the third zone
75 Slide for water removal in the third zone
76 Direction of flow of water outflow
78 (Time-clocked) spiral
79 Means for removing water
80 Cylinder cutter
84 Camera

The invention claimed is:

1. A method for treating waste in a mechanical or mechanical-biological waste treatment plant, the method comprising the following steps of:
   a) providing a container comprising at least two zones, the container comprising:
      a plurality of input points, each input point corresponding to one of the at least two zones;
      an output point; and
      a plurality of water outlets, each water outlet corresponding to one of the at least two zones,
      wherein each input point is located at a different distance from the output point,
   b) introducing waste into the container of the waste treatment plant at one of the plurality of input points, wherein a treatment time of the waste is set by choosing one of the plurality of input points, wherein waste which requires only a short residence time is introduced into the waste treatment plant at an input point located close to the output point of the container,
   c) homogenizing the waste by way of at least one agitator which extends along the entire length of the container,
   d) determining the consistency of the waste in the container,
   e) adding water or waste with a higher water content than the waste in the waste treatment plant if the water content of the waste in the waste treatment plant is below a desired water content, or removing water or adding waste with a lower water content if the water content of the waste is above the desired water content to regulate consistency of the waste in the container, wherein in each zone the water content of the waste is set separately by means of addition of water, removal of water, and/or addition of waste,
   f) transporting the waste inside the container to the output point, wherein the waste passes successively through one or more zones between the input point and the output point, and
   g) removing the waste.

2. The method according to claim 1, characterized in that air and/or an inert gas is fed to an air space above a filling level of the waste and waste air is removed from the air space.

3. The method according to claim 1, characterized in that clumps and/or caking of waste that occur during the homogenization in accordance with step c) are broken up by agitator arms of the at least one agitator and/or means for breaking up incidences of clumping and/or caking of waste.

4. The method according to claim 3, wherein the water is fed to the treated waste in the regions in which the waste is broken up by agitator arms of the at least one agitator and/or means for breaking up incidences of clumping and/or caking of waste.

5. The method according to claim 1, characterized in that the introduced waste is intermixed by the at least one agitator in accordance with step c).

6. The method according to claim 1, characterized in that the waste inside the container is selectively comminuted by the at least one agitator in accordance with step c), wherein soft biological materials are comminuted and hard materials pass through the waste treatment plant without being comminuted.

7. The method according to claim 1, characterized in that the waste is transported by equalization of the filling level.

8. The method according to claim 7, characterized in that the movement of the at least one agitator supports the transport of the waste inside the container, wherein the direction of flow of the waste is not dependent on the direction of rotation of the at least one agitator.

9. The method according to claim 1, characterized in that the consistency of the waste in the waste treatment plant is determined via the power requirement of the at least one agitator.

10. The method according to claim 1, characterized in that the consistency of the waste is determined optically.

11. A device for the mechanical or mechanical-biological treatment of waste, comprising:
    a cylindrical horizontal container comprising:
       at least two zones
       a plurality of input points for introducing waste into the horizontal container, each input point corresponding to one of the at least two zones,
       an output point at one end of the container,
    wherein each input point is located at a different distance from the output point, and
    at least one horizontal agitator, which extends along the entire length of the container,
    wherein each zone comprises a means for feeding water and a water outlet,
    such that a different water content of the waste is settable in each zone, and the device is further set up to transport waste from one of the plurality of input points to the output point through one or more zones between the input point and the output point, and wherein the device is set up to set the treatment time of the waste by introducing the waste at one of the plurality of input points into the at least two zones, wherein waste requiring only a short residence time is introduced at an input point located close to the output point.

12. The device according to claim 11, further comprising means for feeding air and/or an inert gas and also means for removing waste air.

13. The device according to claim 11, characterized in that a closure for closing at least one of the plurality of input points is arranged at the at least one of the plurality of input points.

14. The device according to claim 13, wherein at least one closure for closing at least one of the plurality of input points has means for feeding air and/or an inert gas.

15. The device according to claim 11, characterized in that each of the ater outlets are configured as shafts in the bottom, and wherein slides for closing the shafts are arranged on the shafts.

16. The device according to claim 11, characterized in that a pressure-resistant slide is arranged at the output point, wherein the pressure resistance is rated such that the slide can retain the waste located in the container in each operating state.

17. The device according to claim 11, characterized in that agitator arms and wear-protection elements are arranged on the at least one horizontal agitator.

18. The device according to claim 11, characterized in that means for breaking up clumps and/or caking of waste are arranged in at least one of the at least two zones.

19. The device according to claim 11, characterized in that each of the means for feeding water is configured as openings in the top of the container.

20. The device according to claim 18, characterized in that each of the means for feeding water is are arranged in the region of the agitator arms and/or, if present, in a region with means for breaking up clumps and/or caking.

21. The device according to claim 11, further comprising means for optically monitoring the interior of the container.

\* \* \* \* \*